Patented Sept. 16, 1947

2,427,618

UNITED STATES PATENT OFFICE 2,427,618

CAN SEALING COMPOUND

Harold W. Nagle, Brooklyn, and Julius H. Haines, Forest Hills, N. Y., assignors to Mimex Company, Inc., Long Island City, N. Y., a corporation of New York No Drawing. Application December 26, 1942, Serial No. 470,214

4 Claims. (Cl. 260—742)

This invention relates to improvements in can sealing compounds employing latex (water emulsions of rubber, either natural latex or artificial water-dispersed rubber) as a base.

Latex base compounds are commonly employed as a sealing composition for sealing can ends of food cans and the like. The application of the compound on high speed can end applying machinery involves the ejection of the compound through a hose type nozzle into the periphery of the revolving can end. These can ends are fed to the machine at rates up to and including 400 per minute; the nozzle has to open and close 400 times per minute, allowing a proper amount of compound to be passed into the annular groove or flange of the can end. The latex compound is compounded with materials to render the same pseudo-plastic or thixotropic. The property of thixotropy allows the control of the mobility of the compound such that the compound stays put in the nozzle until additional pressure extrudes it to the can end, it allows the opening and shutting of the nozzle without dripping or splashing of the compound on the can ends, making a clean job, and it permits the compound to stay put in the periphery of the can ends after being deposited therein.

Present day use of known can sealing latex compounds is practiced with some difficulty in the application, drying and stabilizing of the compound to and in can ends. Some of the more disturbing difficulties are the following:

(a) Normal or concentrated latex or dispersions of natural or artificial latices compounded with water soluble gums of the mucilage type (and other materials) will form a skin on the surface when drying. This skin is a continuous film and hinders the drying of the portion of the compound beneath the surface. If forced drying is attempted by use of dry heat, the water under the surface film steams up and expands causing the film to rise and bubble up, making a spongy film full of air pockets under the surface; and (b) Where the can ends are subjected to sudden extreme heat in commercial drying ovens in the can end drying operation, much spoilage of can ends takes place with resulting difficulty in subsequent seaming caused by the blistering of the compound under the curl of the can end.

We have found that rubber latex (natural or synthetic or rubber dispersions) may be compounded with methyl cellulose to produce a stable sealing composition which possesses the desired thixotropic property and which effectively overcomes the described difficulties inherent in the use of present day compounds. A prime object of our present invention pertains to such a can sealing compound. The methyl cellulose which we employ is of the type known as "Methocel." This is a white fibre product soluble in cold water but insoluble in hot water, is insoluble in most organic solvents, and is unaffected by oily or greasy material of animal, vegetable or mineral origin. It is a colorless, odorless, tasteless and non-toxic substance, stable to alkalies and stable to heat without dissociation at elevated temperatures. Heating causes an aqueous solution thereof to gelatinize. This methyl cellulose is available in a number of different viscosity types, from the 15 centipoises grade to the very high viscosity grade of 4000 centpoises. It is the very high viscosity grade of methyl cellulose that we prefer to employ in making the compound of our present invention. The methyl cellulose which we use is of high viscosity having about 4000 centipoises viscosity in a 2% solution. This substance, besides having this higher viscosity, has also the desirable property of some degree of pseudo-plasticity (thixotropy).

We have found that when this methyl cellulose is compounded with natural or artificial latex, the resulting compound possesses the following important characteristics:

1. Because of the low concentration and high viscosity of the methyl cellulose, it is an excellent bodying agent, producing both viscosity and pseudo-plasticity in the compound. The compound may, therefore, be used at the highest speeds of the can end applying machinery with great efficiency. It satisfies all of the requirements of high speed application.

2. Because of its property of gelling-on-heating to an albuminous type of gel, decidedly resembling the coagulation of the coagulated albuminous egg white caused by heating, it helps the drying of the compound considerably. As aforesaid, normal or concentrated latex or dispersions of natural or artificial rubber latices when compounded with other water soluble gums of the mucilage type will form a skin on the surface when drying. This skin is a continuous film and hinders the drying of the portion of the compound under the surface. The water on the surface will steam up and expand under the surface film causing the surface film to rise and bubble up making a spongy film full of air pockets under the surface.

With the use of methyl cellulose this difficulty is overcome. The methyl cellulose in the compound jells just like the white of an egg at about 56° C. By doing this the rubber latex particles are locked in suspension and do not float up to the surface thereby now forming a surface film having a relatively few latex particles in a matrix of methyl cellulose. A microporous film now dries on the surface allowing the remainder of the compound to dry underneath to a dense mass of discontinuous micropores or micells.

3. Because of its unique property of being insoluble in hot water and only swelling in ice water, the methyl cellulose-latex film is insoluble at the food processing temperatures thereby insuring perfect vacuum and sealing characteristics for sealing food cans. It also prevents compound to a certain extent from thickening when exposed to a cold temperature as the methyl cellulose keeps in solution cold whereas it jels under heating.

4. Inherent with its chemical structure is its insolubility in motor oils, greases, vegetable oils, petroleum hydrocarbons, aromatic solvents, alcohol, etc., and only soluble in alcohol water solution, but insoluble in straight alcohol. It incorporates to the latex film additional resistance to the above materials packed in the cans.

5. As aforesaid, in prior can end drying operations much spoilage of can ends and difficulty in seaming were caused by the blistering of the compound under the curl of the end in commercial drying ovens where the can ends get sudden extreme heat. With the use of the gelling Methocel this blistering is obviated and this difficulty is diminished to almost nothing.

In the main, the latex-methyl cellulose sealing composition of the present invention is characterized by possessing, besides the required thixotropic properties, a gelling-on-heating property to which the improvement and the advantages are largely attributed.

As an example of a can sealing compound made in accordance with our present invention, we make a stable mixture of 25 parts of 4000 centipoises methyl cellulose (solution 2.6%) and 10 to 25 parts of rubber latex containing from 35% to 60% solids, with which may be compounded (as is usual in such compounds) water soluble (or dilute ammonia soluble and insoluble in oils, common rubber solvents, alcohols or ketones) gum karaya, gum arabic, gum locust bean, gum shiraz and gum tragacanth, said gums being dissolved in water or dilute ammonia to modify the viscosity and solids content of the final compound.

If desired, one or more of the mineral fillers and pigments such as titanium dioxide, whiting, satin white, carbon black, talc, asbestine, barytes, kaolin, iron oxide, diatomaceous earth, mica, silica, asbestos, and ground cork, may be employed, although such fillers may be omitted without greatly changing the viscosity, pseudo-plasticity or other physical properties or characteristics of the final compound.

The ingredients of the compound should be thoroughly mixed to a uniform mass as by running through a colloid mill, ball mill or centrifugal pump.

To improve the sticking-to-tin property of the compound as well as its adhesiveness and water-proofness at can processing temperatures and the attendant steam atmosphere, we have discovered that an agent or ingredient may be added which acts, when the composition is being dried, as a latex coagulant and a water-proofing medium for the resulting film. We have also found that such an agent also acts as a stabilizer for the compound when in colloidal condition.

Any of a number of such addition agents or ingredients may be used, particularly resins which have sufficient acidity to be readily saponifiable to form an ammonium soap. As a preferred example of such an agent, we use an ammonium soap of hydroabietic acid (hydrogenated rosin). This is made by treating hydrogenated rosin with ammonia and water under heat and pressure to completely saponify the rosin, producing ammonium hydroabietate.

To use the same, we add, with suitable agitation, from 15 to 30 parts of a 25% solution of this ammonium hydroabietate (the viscosity of which may desirably be decreased, as by addition of a small amount of a peptizing agent such as sulphonated castor-oil, proteins and the like) to the composition as above compounded.

The mechanism of this addition product is as follows:

1. While the rosin, still in the soap form, is colloidally dispersed in the composition, it stabilizes the rubber latex and the composition.

2. On drying the composition, the excess ammonia evaporates, and the rosin soap begins to decompose. This liberates free rosin acids in situ (hydroabietic acid) which in turn coagulates the latex.

3. The hydroabietic acid now left on the dried film with the latex, water-proofs the latex film and markedly increases its adhesion to tin at the steam and processing temperatures in boiling water.

4. The hydroabietic acid is stable over long periods of time and does not oxidize, polymerize, or affect the aging of the rubber which would be the case if ordinary rosin (abietic acid) were used.

In place of the hydrogenated rosin one may use the glycerol, glycol esters of the hydroabietic acid of medium acidity or most any other ammonia saponifiable resin of the same melting range as the hydroabietic acid to the same advantage.

The manner of making the new can sealing compound and the advantages thereof will be apparent from the above detailed description. The methyl cellulose-latex composition is preferably compounded with water-soluble gums of a class customarily used in these compounds and may also be combined with mineral fillers as described. The process or manner of compounding these ingredients is quite simple. The resulting compound is used at the highest speeds of the high speed can end applying machinery and the pseudo-plastic property imparted to the compound by the methyl cellulose allows the control of the mobility of the compound such that the compound stays put in the nozzle until additional pressure extrudes it to the can end, allows the opening and shutting of the nozzle without dripping or splashing of the compound on the can ends, and permits the compound to stay put and stable in the can ends. Because of the property imparted to the compound of gelling-on-heating, the compound drys to a dense mass (eliminating air pockets and spongy films), thus making an ideal gasket or sealing medium. Because of the unique property of methyl cellulose being insoluble in hot water, the resulting film is insoluble at the food processing temperatures thereby insuring perfect vacuum for sealing food cans. Its insolubility in most organic solvents renders the compound ideal for cans containing oils, greases, hydrocarbon solvents and the like. And because of the gelling characteristic, blistering during drying and difficulty in seaming are reduced to a minimum or entirely obviated. As improved by the addition product, the compound possesses an improved sticking-to-tin property and is characterized by water-proofness at can processing temperatures and in a steam atmosphere by increased adhesiveness and by the other properties described.

While we have described our invention in connection with preferred examples, it will be understood that many changes may be made therein without departing from the spirit of the invention defined in the following claims.

We claim:

1. A rubber latex base liquid sealing compound possessing thixotropic and gelling-on-heating properties comprising a stable mixture of rubber latex dispersion as the base and a cold water soluble methyl cellulose solution of low concentration and high-viscosity, the methyl cellulose solution imparting viscosity and thixotropy and the methyl cellulose imparting a gelling-on-heating property to the compound.

2. A rubber latex base liquid sealing compound possessing thixotropic and gelling-on-heating properties comprising a stable mixture of rubber latex dispersion as the base and a cold water soluble methyl cellulose solution having the following composition: about 10 to 25 parts of rubber latex containing from 35% to 60% solids and about 25 parts of methyl cellulose solution containing about 2.6% methyl cellulose concentration, the methyl cellulose solution imparting viscosity and thixotropy and the methyl cellulose imparting a gelling-on-heating property to the compound.

3. A rubber latex base liquid sealing compound possessing thixotropic and gelling-on-heating properties comprising a stable mixture of rubber latex dispersion as the base, a cold water soluble high-viscosity methyl cellulose solution and a water soluble gum, the methyl cellulose solution imparting viscosity and thixotropy and the methyl cellulose imparting a gelling-on-heating property to the compound.

4. A rubber latex base sealing compound possessing thixotropic and gelling-on-heating properties comprising a stable mixture of rubber latex dispersion as the base, a cold water soluble methyl cellulose solution and ammonium hydroabietate having the following composition: about 10 to 25 parts of rubber latex containing from 35% to 60% solids, about 25 parts of methyl cellulose solution containing about 2.6% methyl cellulose concentration, and from 15 to 30 parts of a 25% solution of ammonium hydroabietate, the methyl cellulose solution imparting viscosity and thixotropy and the methyl cellulose imparting a gelling-on-heating property to the compound, the ammonium hydroabietate acting, upon drying the compound, to coagulate the latex thereof and to waterproof the compound.

HAROLD W. NAGLE.
JULIUS H. HAINES.

REFERENCES CITED

The following references are of record in the file of this patent:

UNITED STATES PATENTS

| Number | Name | Date |
|---|---|---|
| 1,765,134 | Dewey | June 17, 1930 |
| 2,016,286 | Levin | Oct. 8, 1935 |
| 2,076,781 | Jacobsen | Apr. 13, 1937 |
| 2,273,425 | Traylor | Feb. 17, 1942 |
| 2,279,256 | Mark | Aug. 7, 1942 |

FOREIGN PATENTS

| Number | Country | Date |
|---|---|---|
| 252,176 | Great Britain | Oct. 12, 1927 |
| 305,490 | Great Britain | Apr. 4, 1929 |
| 563,905 | Germany | Nov. 11, 1932 |